United States Patent
Baek et al.

(10) Patent No.: US 9,844,997 B2
(45) Date of Patent: Dec. 19, 2017

(54) AIR CONDITIONER FOR VEHICLE

(71) Applicant: Halla Visteon Climate Control Corp., Daejeon (KR)

(72) Inventors: Seungho Baek, Daejeon (KR); Daekeun Park, Daejeon (KR); Ho Lee, Daejeon (KR); Donggyun Kim, Daejeon (KR); Sihyung Kim, Daejeon (KR); Namjoon Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 276 days.

(21) Appl. No.: 14/707,620

(22) Filed: May 8, 2015

(65) Prior Publication Data
US 2015/0328957 A1   Nov. 19, 2015

(30) Foreign Application Priority Data

May 15, 2014   (KR) .................. 10-2014-0058179
Nov. 27, 2014   (KR) .................. 10-2014-0167514

(51) Int. Cl.
*B60H 1/32* (2006.01)
*B60H 1/00* (2006.01)

(52) U.S. Cl.
CPC ..... *B60H 1/00521* (2013.01); *B60H 1/00514* (2013.01); *B60H 1/00557* (2013.01); *B60H 1/3202* (2013.01); *B60H 2001/00635* (2013.01)

(58) Field of Classification Search
CPC ............ B60H 1/00521; B60H 1/00557; B60H 1/00514; B60H 1/3202; B60H 2001/00635
USPC .......................................................... 62/515
See application file for complete search history.

(56) References Cited

U.S. PATENT DOCUMENTS

| | | | | |
|---|---|---|---|---|
| 4,067,204 A | * | 1/1978 | Riello ............... | F24F 1/027 62/262 |
| 5,193,609 A | * | 3/1993 | Cowart ............. | B60H 1/3229 165/122 |
| 5,354,101 A | * | 10/1994 | Anderson, Jr. ...... | F16L 39/00 285/124.5 |
| 5,555,739 A | * | 9/1996 | Kujirai ............. | B60H 1/00571 62/225 |
| 5,899,505 A | * | 5/1999 | Tsunoda ........... | B60H 1/00571 285/124.1 |
| 5,941,304 A | * | 8/1999 | Inaba .............. | F28F 9/0251 165/178 |
| 8,186,719 B2 | * | 5/2012 | Kume .............. | F28D 1/0341 165/176 |

(Continued)

FOREIGN PATENT DOCUMENTS

KR   20100089191 A   8/2010

*Primary Examiner* — Len Tran
*Assistant Examiner* — Kirstin Oswald
(74) *Attorney, Agent, or Firm* — Norton Rose Fulbright US LLP

(57) ABSTRACT

Disclosed herein is an air conditioner for a vehicle which includes a sealing member having a first sealing part for sealing a space between a flange of inlet and outlet pipes of an evaporator and a pipe penetration part of an air-conditioning case and a second sealing part for sealing a space between a dash panel of the vehicle and an outer face of the air-conditioning case, thereby simplifying an assembling process and reducing manufacturing costs by reducing the number of components for sealing of the pipe penetration part and minimizing vibration and noise transferred from an engine room side of the vehicle to the air-conditioning case.

12 Claims, 14 Drawing Sheets

(56) References Cited

U.S. PATENT DOCUMENTS

| | | | | |
|---|---|---|---|---|
| 8,430,365 B2* | 4/2013 | Benoit | ................... | F16L 5/14 |
| | | | | 248/49 |
| 2005/0109885 A1* | 5/2005 | Welsh | ............... | B60H 1/00571 |
| | | | | 248/56 |
| 2006/0130774 A1* | 6/2006 | Chiang | .................... | A01K 1/03 |
| | | | | 119/455 |
| 2006/0230774 A1* | 10/2006 | Shibata | .............. | B60H 1/00521 |
| | | | | 62/239 |
| 2008/0164006 A1* | 7/2008 | Karamanos | ........... | F24F 1/0059 |
| | | | | 165/67 |
| 2009/0200756 A1* | 8/2009 | Yamamoto | ......... | B60H 1/00571 |
| | | | | 277/616 |

* cited by examiner

PRIOR ART

PRIOR ART

PRIOR ART

PRIOR ART

AIR CONDITIONER FOR VEHICLE

This application claims priority from Korean Patent Application Nos. 10-2014-0058179 filed on May 15, 2014 and 10-2014-0167514 filed on Nov. 27, 2014, which are hereby incorporated by reference in their entireties.

BACKGROUND OF THE INVENTION

Field of the Invention

The present invention relates to an air conditioner for a vehicle, and more particularly, to an air conditioner for a vehicle, which includes a sealing member having a first sealing part for sealing a space between a flange of inlet and outlet pipes of an evaporator and a pipe penetration part of an air-conditioning case and a second sealing part for sealing a space between a dash panel of the vehicle and an outer face of the air-conditioning case, thereby simplifying an assembling process and reducing manufacturing costs by reducing the number of components for sealing of the pipe penetration part and minimizing vibration and noise transferred from an engine room side of the vehicle to the air-conditioning case.

Background Art

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode switching door for selectively blowing the air cooled by the evaporator or heated by the heater core toward parts of the interior of the vehicle.

According to independent structures of a blower unit, an evaporator unit and a heater core unit, such an air conditioner is classified into a three-piece type air conditioner in which the blower unit, the evaporator unit and the heater core unit are disposed independently, a semi-center type air conditioner in which the evaporator unit and the heater core unit are embedded in the air-conditioning case and the blower unit is mounted separately, and a center-mounting type air conditioner in which the three units are all embedded in the air-conditioning case.

FIG. 1 illustrates an example of a conventional air conditioner for a vehicle. As shown in the drawing, the air conditioner 1 includes: a blower 10 which has an inside air inlet 21 and an outside air inlet 22 formed at one side, an inside air and outside air switching door 23 for selectively opening and closing the inside air inlet 21 and the outside air inlet 22 and a blowing fan 35 for forcedly blowing inside air and outside air toward an air inflow port 43 of an air-conditioning case 40; and the air-conditioning case 40 which includes the air inflow port for introducing the air blown from the blower 10 and a plurality of air outflow ports 44 for discharging the air introduced to the air inflow port 43 and in which an evaporator 41 and a heater core 42 are mounted to be spaced apart from each other at a predetermined interval in order.

Moreover, the air conditioner further includes a temperature-adjusting door 45 mounted between the evaporator 41 and the heater core 42 for controlling temperature by adjusting the degree of opening of a cold air passageway bypassing the heater core 42 and of a warm air passageway passing through the heater core 42.

Furthermore, the air conditioner further includes mode doors 46 which are respectively mounted at the air outflow ports to open and close the corresponding air outflow ports 44 according to various air-conditioning modes.

FIG. 2 is a perspective view showing the semi-center type air conditioner 1 out of the air conditioners of three types. The air conditioner 1 includes: an air-conditioning case 40 having an air inflow port 43 formed at an entrance side and a plurality of air outflow ports 44 formed at an exit side; and a blower 10 for selectively introducing inside air and outside air through an inside and outside air inlet 22 formed at an upper side to forcedly blow the air toward the air inflow port 43.

Furthermore, an evaporator 41 and a heater core (not shown) are mounted inside the air-conditioning case 40 in order, and a temperature-adjusting door (not shown) for controlling temperature and mode doors (not shown) for carrying out various air-conditioning modes are mounted inside the air-conditioning case 40.

The evaporator 41 has inlet and outlet pipes 41a formed protrudingly at one side of the evaporator 41 to introduce and discharge refrigerant, and a flange 41b is joined to end portions of the inlet and outlet pipes 41a to be joined with an expansion valve (not shown).

Additionally, the flange 41b of the inlet and outlet pipes 41a is exposed to the outside of the air-conditioning case 40 to be joined with the expansion valve. In this instance, a pipe penetration part 47 is formed on the front side of the air-conditioning case 40 to support the inlet and outlet pipes 41a exposed to the outside.

In the meantime, the air-conditioning case 40 generally has a structure that upper cases 40a and 40b and an integrated lower case 40c are joined to each other to prevent leakage of condensate water. As shown in FIG. 3, the evaporator 41 is assembled between the upper cases 40a and 40b and the lower case 40c. Here, because the pipe penetration part 47 is formed on the joined side of the upper and lower cases 40a and 40b, the pipe penetration part 47 is also divided into an upper part and a lower part.

According to the air conditioner 1, the air blown to the inside of the air-conditioning case 40 by the blower 10 passes the evaporator 41, and then, the air is cooled or heated while selectively passing through the heater core by the temperature-adjusting door. After that, the air cooled or heated is supplied to the interior of the vehicle through ducts (not shown) connected with the air outflow ports 44 so as to cool or heat the interior of the vehicle.

Meanwhile, when an air conditioning system for a vehicle is operated, the evaporator 41 generates condensate water around the evaporator 41 while exchanging heat with the outdoor air because cold refrigerant circulates inside the evaporator 41. Of course, condensate water is generated also in the inlet and outlet pipes 41a of the evaporator 41.

In this instance, the condensate water generated from the evaporator 41 drops down in the direction of gravity or drops to a lower part of the air-conditioning case 40 by the blown wind, and then, is discharged out through a condensate outlet (not shown) formed at the lower part of the air-conditioning case 40. However, condensate water generated in the inlet and outlet pipes 41a may directly drop to the inside of the air-conditioning case 40, but some of the condensate water flows along the inlet and outlet pipes 41a and is introduced into the pipe penetration part 47.

Therefore, in order to prevent the condensate water introduced into the pipe penetration part 47 from leaking out of the air-conditioning case 40, insulating members 48a are respectively wound on the inlet and outlet pipes 41a at the rear side of the flange 41b, and then, a fixture 48b which is made of a plastic material and is divided into the right and left is joined and fastened on the insulating members 48a by a screw 48c.

In this instance, because the fixture 48b is joined to surround the inlet and outlet pipes 41a on which the insulating members 48a are wound and a joining groove 48e is formed in the circumference of the fixture 48b, they fix the inlet and outlet pipes 41a and prevents movement of the flange 41b when the joining groove 48e is fit to a support part 47a of the pipe penetration part 47.

Moreover, a sealing member 48d which is made of an NBR material is mounted in front of the fixture 48b to prevent leakage of condensate water.

However, the conventional air conditioner for a vehicle has several problems in that manufacturing costs are increased and assembly of the air conditioner is very complicated because it requires lots of components, such as the insulating members 48a respectively wound on the inlet and outlet pipes 41a, the fixture 48b which is made of a plastic material and is divided into the right and left, and the screw 48c, in order to prevent leakage of condensate water.

Furthermore, the conventional air conditioner for a vehicle has another problem in that the air-conditioning case 40 generates vibration to generate booming noise or serves as a sound box to amplify booming noise because vibration of an engine room side transferred from an engine and a compressor is transferred to the air-conditioning case 40 through the inlet and outlet pipes 41a and the fixture 48b.

SUMMARY OF THE INVENTION

Accordingly, the present invention has been made to solve the above-mentioned problems occurring in the prior arts, and it is an object of the present invention to provide an air conditioner for a vehicle, which includes a sealing member having a first sealing part for sealing a space between a flange of inlet and outlet pipes of an evaporator and a pipe penetration part of an air-conditioning case and a second sealing part for sealing a space between a dash panel of the vehicle and an outer face of the air-conditioning case, thereby simplifying an assembling process and reducing manufacturing costs by reducing the number of components for sealing of the pipe penetration part and minimizing vibration and noise transferred from an engine room side of the vehicle to the air-conditioning case.

To accomplish the above object, according to the present invention, there is provided an air conditioner for a vehicle which includes: an evaporator having inlet and outlet pipes to end portions of which a flange is joined; and an air-conditioning case in which the evaporator is embedded and which has a pipe penetration part formed at one side thereof so that the inlet and outlet pipes pass, the air conditioner further including: a sealing member which is mounted to surround an outer face of the flange to seal a space between the flange and the pipe penetration part, wherein the sealing member includes: a first sealing part which is inserted into the pipe penetration part to seal a space between the outer face of the flange and an inner face of the pipe penetration part 130; and a second sealing part which is formed to be stepped from the first sealing part to seal a space between the dash panel of the vehicle and the outer face of the air-conditioning case.

According to the present invention, the air conditioner for the vehicle can simplify an assembling process and reduce manufacturing costs by reducing the number of components for sealing of the pipe penetration part and minimize vibration and noise transferred from an engine room side of the vehicle to the air-conditioning case because including a sealing member having a first sealing part for sealing a space between a flange of inlet and outlet pipes of an evaporator and a pipe penetration part of an air-conditioning case and a second sealing part for sealing a space between a dash panel of the vehicle and an outer face of the air-conditioning case.

Moreover, the circumference supporting wall which is spaced apart from the circumference of the pipe penetration part at a predetermined interval and surrounds the outer circumferential surface of the second sealing part is protrudingly formed on the outer face of the air-conditioning case around the pipe penetration part, thereby preventing separation of the sealing member.

Furthermore, the bent portion which is bent in one direction is formed at an end portion of the auxiliary supporting wall, and the receiving groove in which the bent portion is accommodated to get in contact is formed in the insertion groove of the second sealing part, thereby enhancing sealing performance between the second sealing part and the air-conditioning case.

Additionally, the removed portion that the partial section of the outer wall of the insertion groove is removed to be opened is formed at the second sealing part, thereby preventing the undercut when the sealing member is injection-molded.

Moreover, the sealing member is divided into two parts corresponding to the upper and lower cases of the air-conditioning case, thereby enhancing assemblability.

Furthermore, the tool insertion hole to which the leakage checking tool for testing whether or not there is any leak of refrigerant is formed in the flange, thereby allowing a user to easily test leakage and enhancing manufacturing.

Additionally, the concave portion to which the leakage checking tool is inserted is formed on the sealing member, thereby securing sealability between the air-conditioning case and the flange and allowing the user to easily insert the leakage checking tool.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
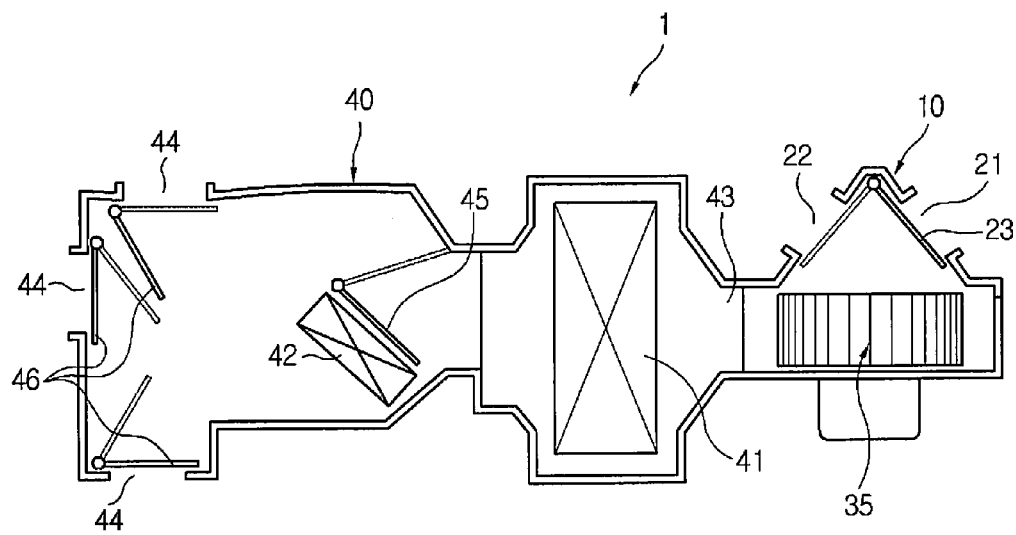
FIG. 1 is a view showing an example of an configuration of a conventional air conditioner for a vehicle.
Figure 2:
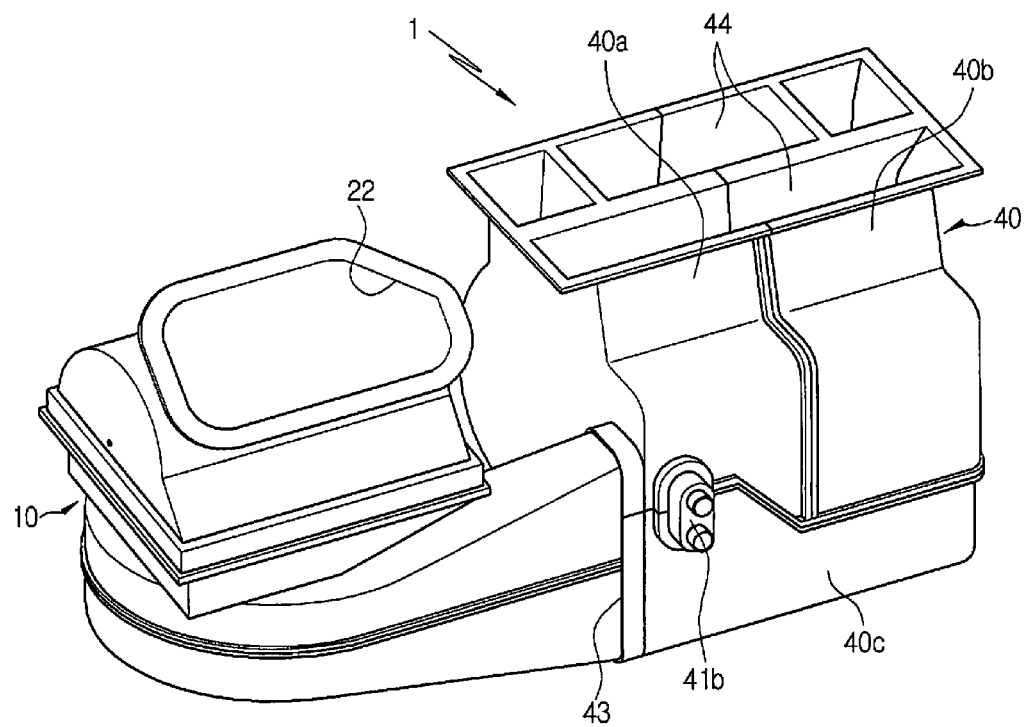
FIG. 2 is a perspective view of a conventional semi-center type air conditioner.
Figure 3:
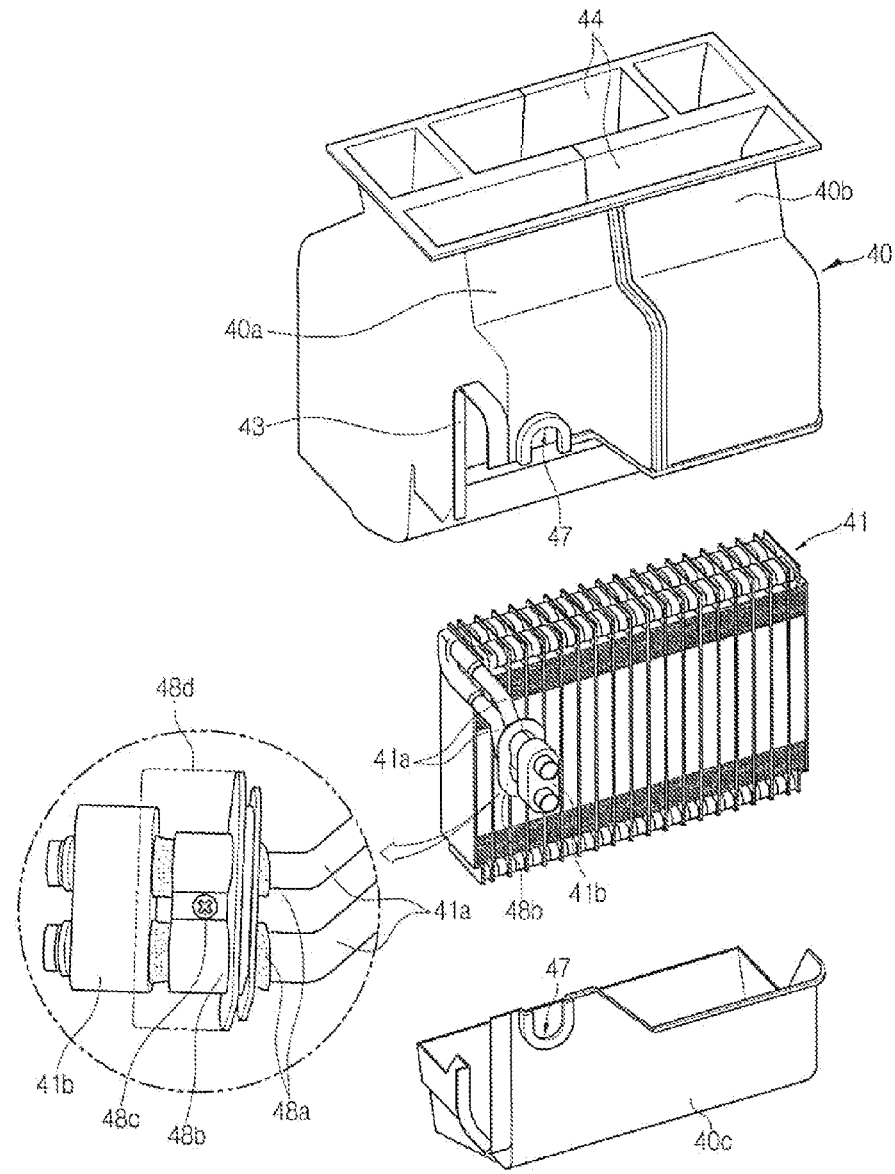
FIG. 3 is a perspective view showing a state where an upper case and a lower case of the conventional semi-center type air conditioner are disassembled.
Figure 4:
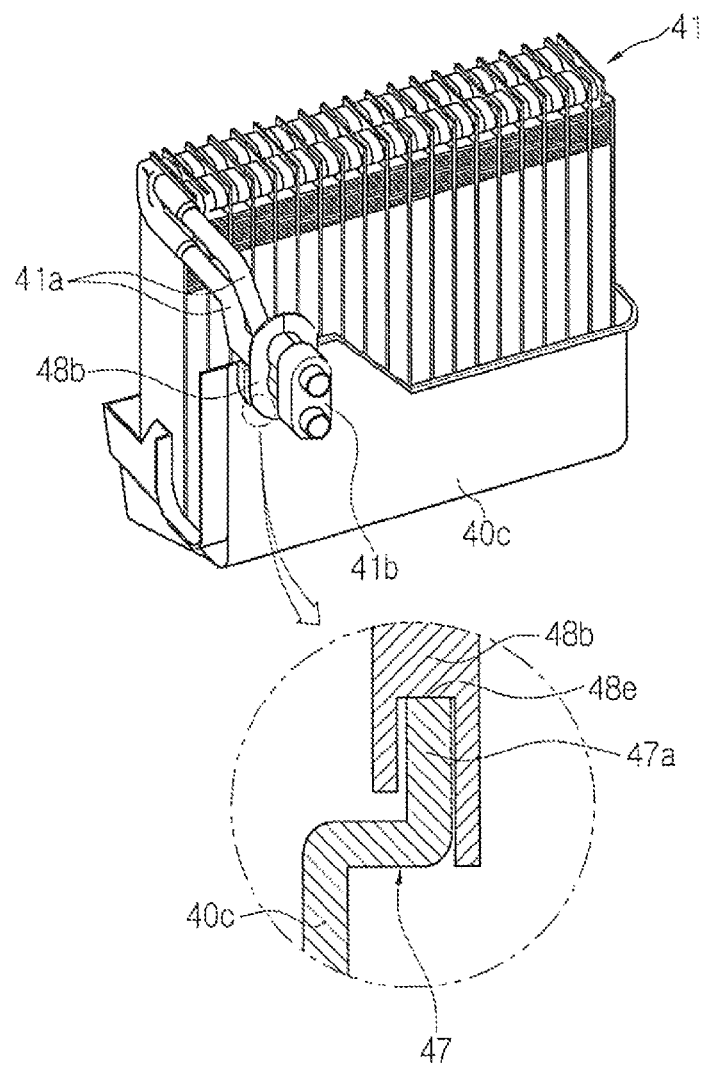
FIG. 4 is a perspective view showing a state where a fixture is joined to a pipe penetration part of the lower case of the conventional semi-center type air conditioner.
Figure 5:
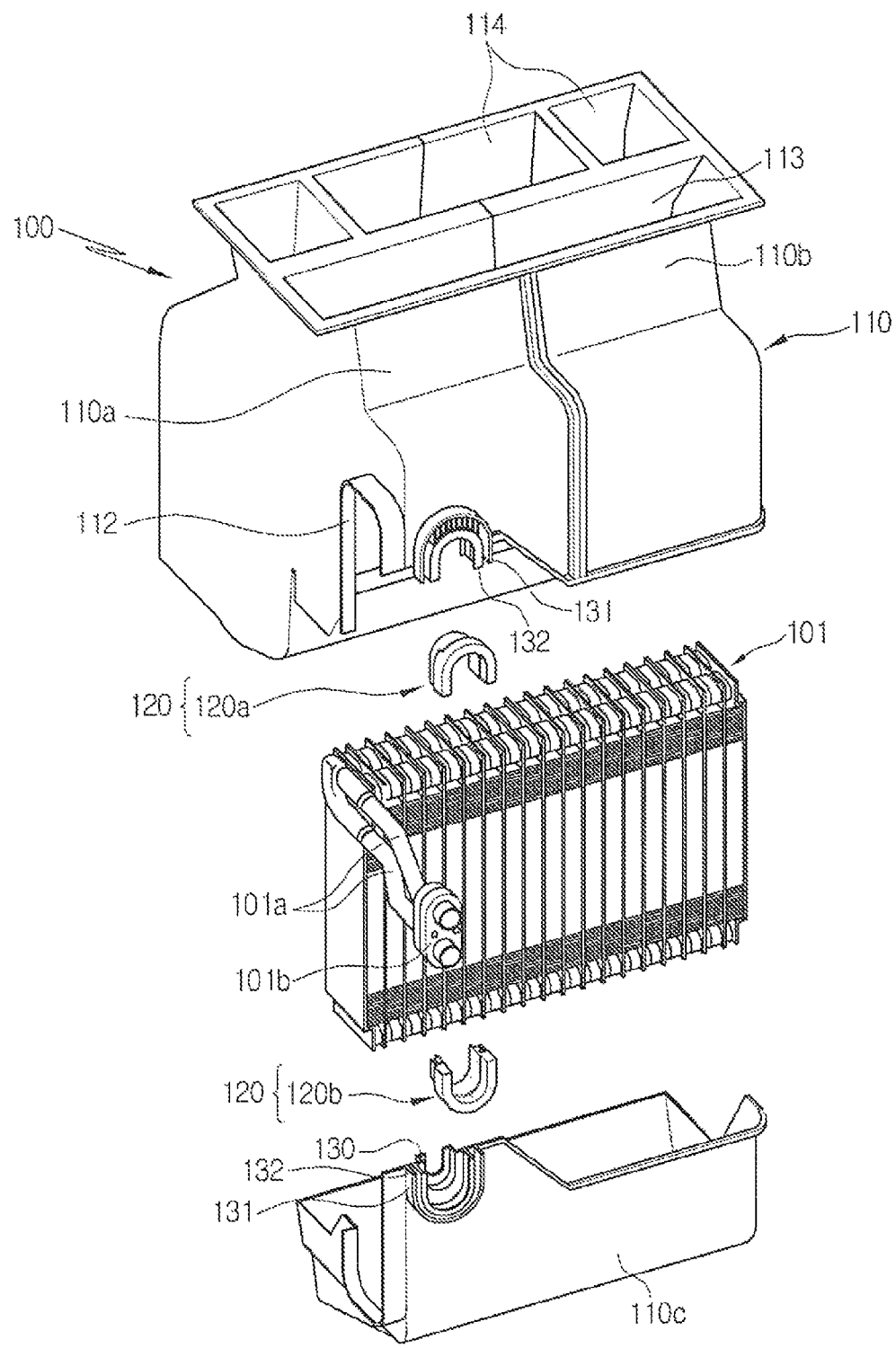
FIG. 5 is an exploded perspective view of an air conditioner for a vehicle according to the present invention.
Figure 6:
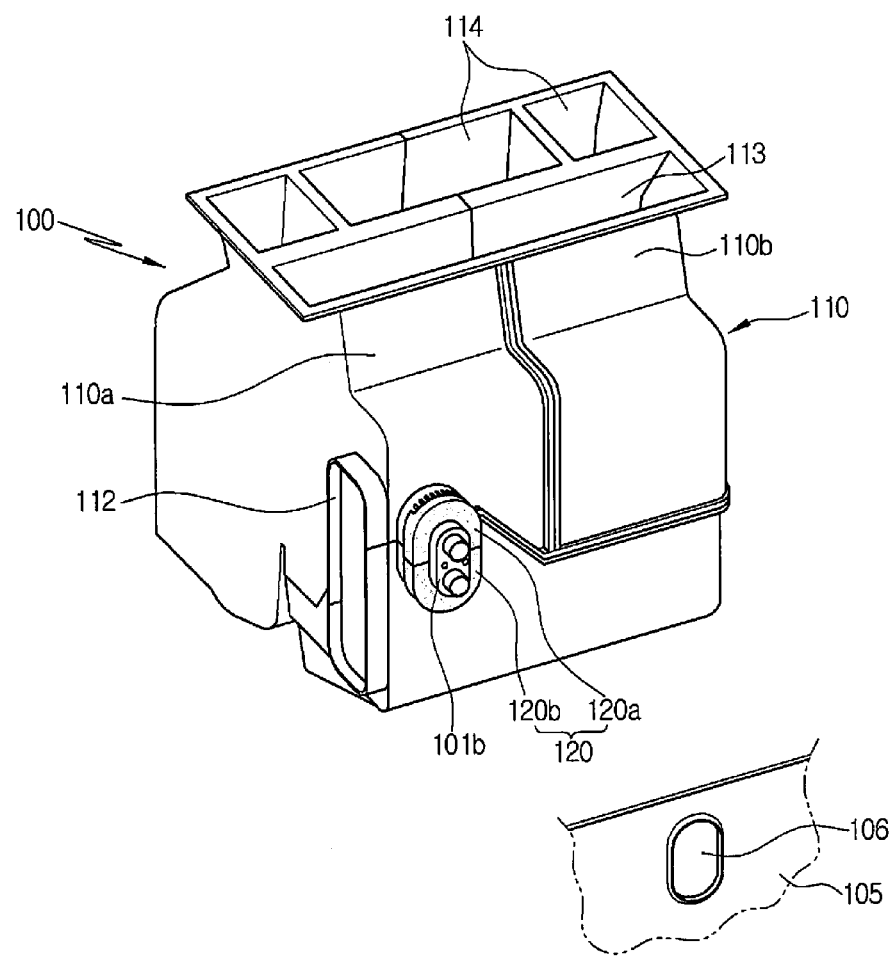
FIG. 6 is a perspective view of the air conditioner for the vehicle according to the present invention.
Figure 7:
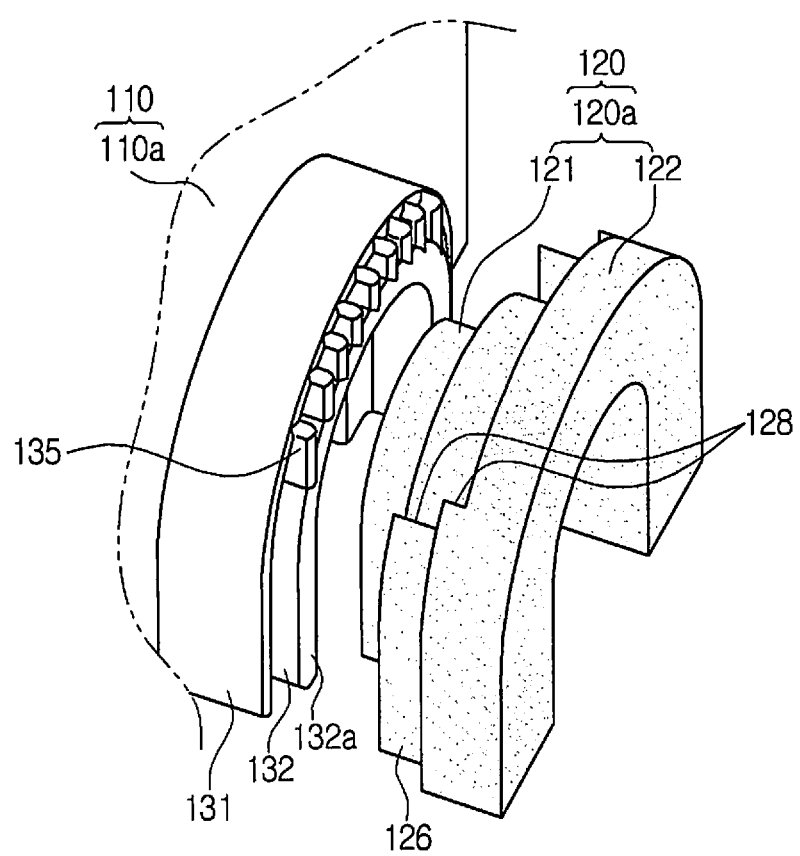
FIG. 7 is a perspective view showing a state where a sealing member is separated from a pipe penetration part of the air conditioner for the vehicle according to the present invention.
Figure 8:
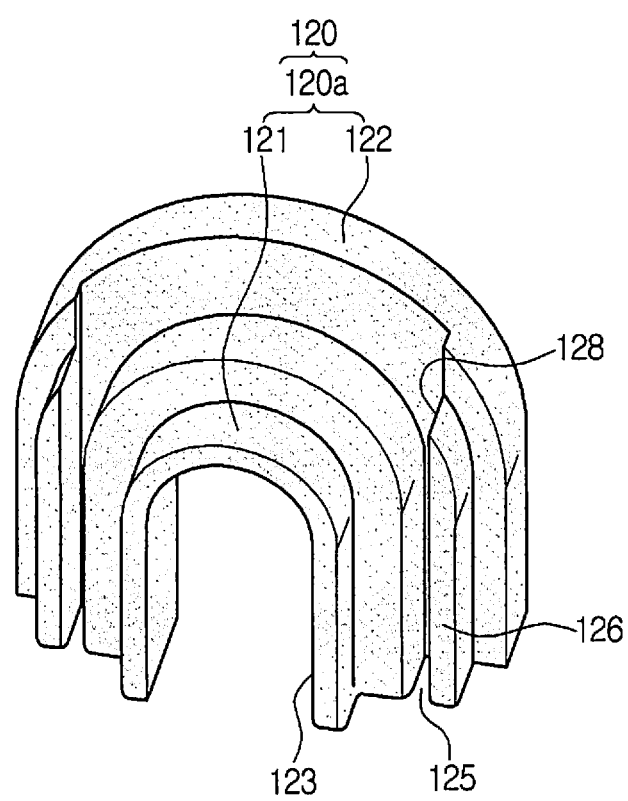
FIG. 8 is a perspective view of the sealing member of FIG. 7 viewed from the different direction.
Figure 9:
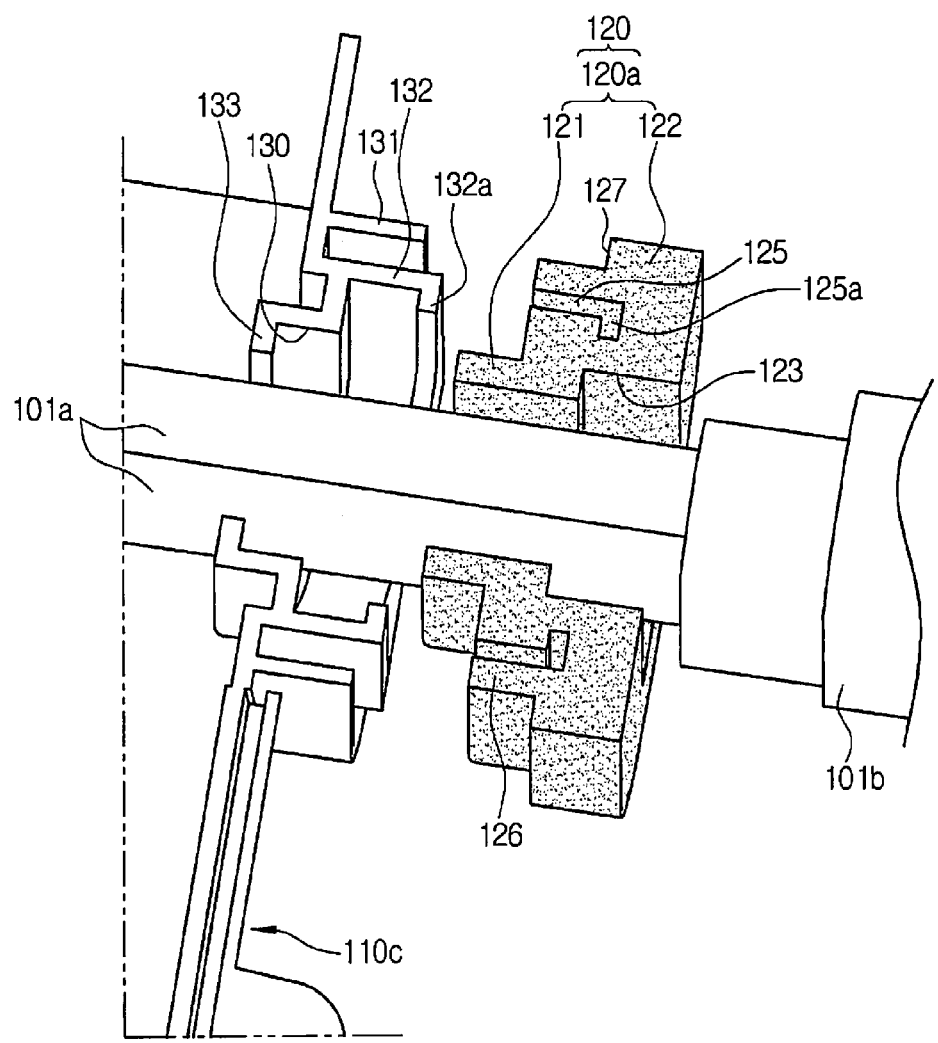
FIG. 9 is a perspective view showing a state where the sealing member and a flange are separated from the pipe penetration part of the air conditioner for the vehicle according to the present invention.
Figure 10:
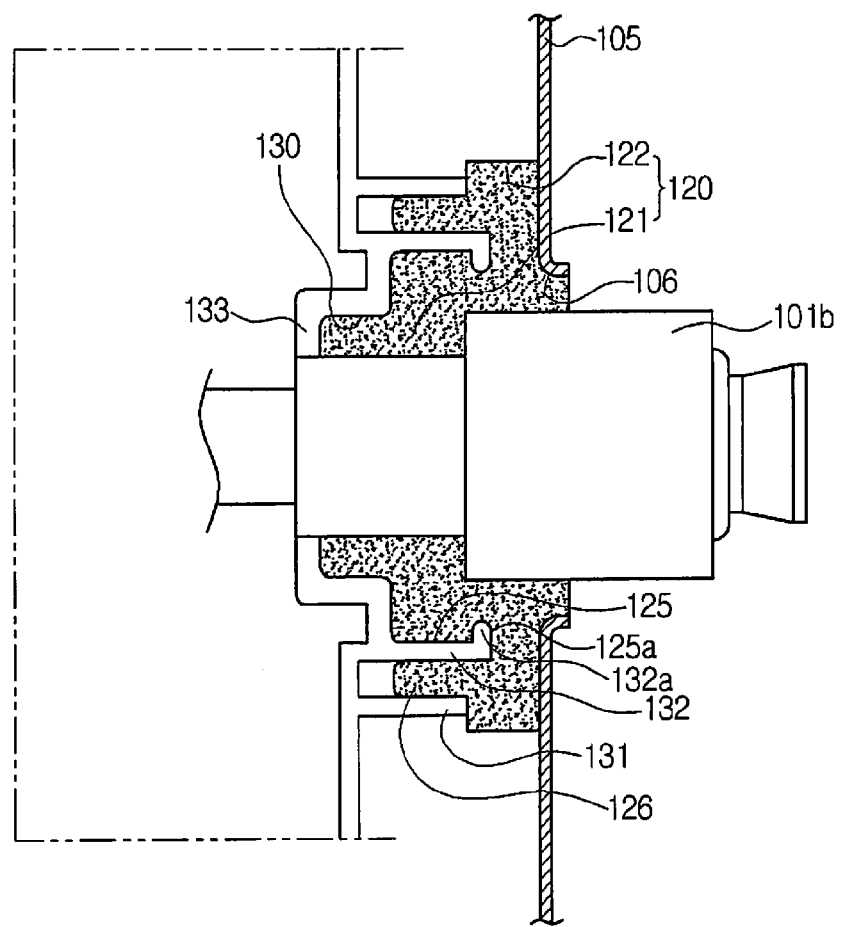
FIG. 10 is a sectional view showing a state where the sealing member and the flange are assembled to the pipe penetration part and get in contact with a dash panel in the air conditioner for the vehicle according to the present invention.
Figure 11:
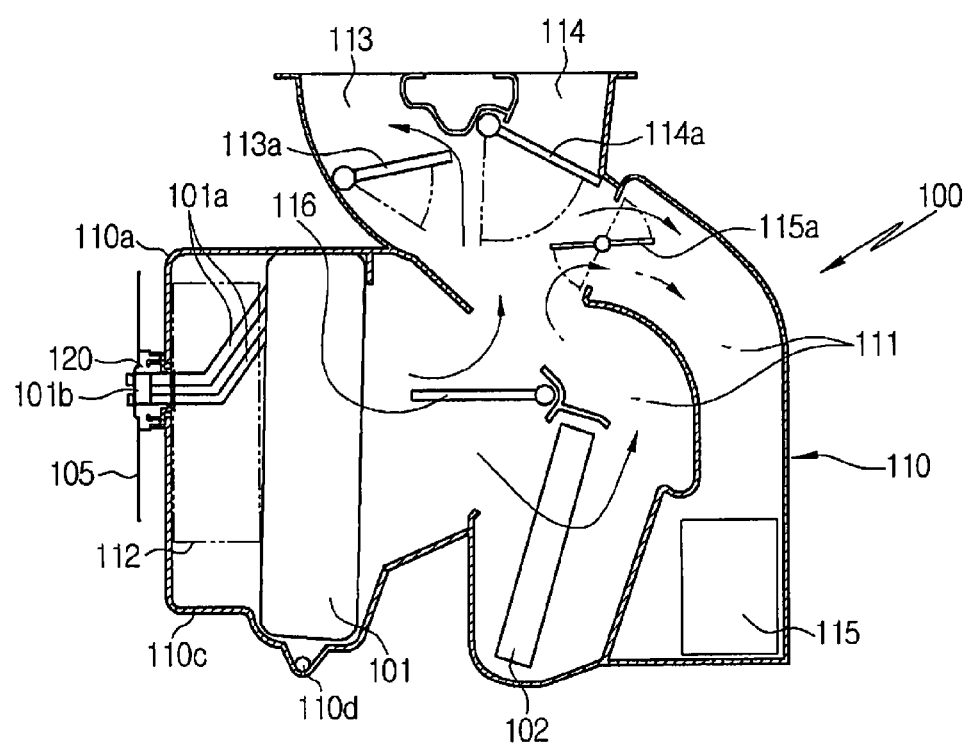
FIG. 11 is a sectional view of the air conditioner for the vehicle according to the present invention.

Reference will be now made in detail to the preferred embodiments of the present invention with reference to the attached drawings.

As shown in the drawing, an air conditioner 100 for a vehicle according to a preferred embodiment of the present invention includes: an air-conditioning case 110 having an air inflow port 112 formed on one side thereof, a defrost vent 113, a face vent 114 and a floor vent 115 which are air outflow ports formed at the other side thereof, and an air passageway 111 formed inside the air-conditioning case 110 to communicate the air inflow port 112 with the vents 113, 114 and 115; an evaporator 101 and a heater 102 which are mounted on the air passageway 111 of the air-conditioning case 110 in order; and a temperature-adjusting door 116 mounted between the evaporator 101 and the heater 102 for adjusting the degree of opening of a passageway which bypasses the heater 102 and of a passageway which passes through the heater 102.

The air-conditioning case 110 is mounted adjacent to the rear side of a dash panel 105 which partitions the interior of the vehicle and an engine room.

Moreover, a plurality of mode doors 113a, 114a and 115a are respectively mounted at the vents 113, 114 and 115 to selectively distribute the air, which selectively passed the heater core 102 after passing through the evaporator 101, to the ducts (not shown) which communicate with specific positions inside the vehicle.

In the meantime, a blower (not shown) is mounted at the air inflow port 112 of the air-conditioning case 110 to blow indoor air or outdoor air.

Furthermore, the evaporator 101 is formed by a plurality of tubes are stacked and includes radiation fins mounted between the tubes and inlet and outlet pipes 101a mounted at one side of the evaporator 101 to protrude forward in order to introduce and discharge refrigerant.

Additionally, a flange 101b is joined to end portions of the inlet and outlet pipes 101a to be joined with an expansion valve (not shown). The flange 101b is joined in a state where the inlet and outlet pipes 101a are spaced apart from each other at a predetermined interval.

In addition, the flange 101b of the inlet and outlet pipes 101a is exposed to the outside of the air-conditioning case 110 to be joined with the expansion valve. In this instance, a pipe penetration part 130 is formed to penetrate one side (front side) of the air-conditioning case 110 in such a way that the inlet and outlet pipes 101a penetrate one side of the air-conditioning case 110.

Moreover, the air-conditioning case 110 is formed by assembly of upper cases 110a and 110b and a lower case 110c, namely, is divided into the upper cases 110a and 110b and the lower case 110c based on the pipe penetration part 130.

In this instance, the upper cases 110a and 110b are located at an upper side of the evaporator 101 and have the structure that divided right and left cases are assembled. The lower case 110c is located at a lower portion of the evaporator 101, and is manufactured in a manner that it is detachable from the upper cases 110a and 110b to enhance mounting performance of the evaporator 101, and is made into a single body to prevent leakage of condensate water.

Furthermore, the lower case 110c has a condensate outlet 110d formed at a lower portion thereof to make condensate water generated from the evaporator 101 be smoothly discharged to the outside of the air-conditioning case 110.

Meanwhile, because the upper cases 110a and 110b and the lower case 110c are divided based on the pipe penetration part 130, the pipe penetration part 130 is also divided into upper and lower parts. That is, a half of the pipe penetration part 130 is formed at the upper case 110a and the rest of the pipe penetration part 130 is formed at the lower case 110c. Therefore, when the upper cases 110a and 110b and the lower case 110c are assembled together, the pipe penetration part 130 is formed into a single body.

A support part 133 is formed at an end portion of the inside of the pipe penetration part 130 to support an outer face of the flange 101b.

Additionally, a sealing member 120 is mounted to fix the flange 101b of the inlet and outlet pipes 101a of the evaporator 101 to the pipe penetration part 130 of the air-conditioning case 110 and to seal a space between the flange 101b and the pipe penetration part 130.

The sealing member 120 is made of a polyurethane material to provide predetermined elasticity and is mounted to surround the outer face of the flange 101b to seal the space between the flange 101b and the pipe penetration part 130.

The sealing member 120 includes: a first sealing part 121 which is inserted into the pipe penetration part 130 to seal a space between the outer face of the flange 101b and an inner face of the pipe penetration part 130; and a second sealing part 122 which is formed to be stepped from the first sealing part 121 to seal a space between the dash panel 105 of the vehicle and the outer face of the air-conditioning case 110.

In addition, a through hole 123 of the sealing member 120 through which the flange 101b passes is formed to be stepped from the outer face of the flange 101b, thus the stepped through hole 123 of the sealing member 120 is caught to the stepped outer face of the flange 101b when the sealing member 120 is mounted on the outer face of the flange 101b.

Moreover, a circumference supporting wall 131 which is spaced apart from the circumference of the pipe penetration part 130 at a predetermined interval and surrounds the outer circumference of the second sealing part 122 is protrudingly formed on the outer face of the air-conditioning case 110 around the pipe penetration part 130.

That is, the circumference supporting wall 131 is formed to surround the outer face of the sealing member 120 to prevent separation of the sealing member 120.

Furthermore, an auxiliary supporting wall 132 protrudes from the outer face of the air-conditioning case 110 inside the circumference supporting wall 131, and an insertion groove 125 into which the auxiliary supporting wall 132 is inserted to get in contact is formed in the second sealing part 122.

Additionally, a bent portion 132a which is bent in one direction is formed at an end portion of the auxiliary supporting wall 132, and a receiving groove 125a in which the bent portion 132a is accommodated to get in contact is formed in the insertion groove 125 so as to enhance sealing performance between the second sealing part 122 and the air-conditioning case 110.

In the meantime, the auxiliary supporting wall 132 and the circumference supporting wall 131 have a shape corresponding to the shape of the pipe penetration part 130 and are respectively formed on the circumference of the pipe penetration part 130 to be spaced apart from each other at a predetermined interval.

In this instance, the auxiliary supporting wall 132 and the circumference supporting wall 131 are formed in order from the pipe penetration part 130.

In addition, in a case that the insertion groove 125 is formed in the second sealing part 122 in order to prevent leakage between the sealing member 120 and the air-conditioning case 110, when the sealing member 120 is injection-molded in a mold, undercut may be formed by an outer wall 126 of the insertion groove 125 in an aspect of the direction to remove the mold.

Therefore, a removed portion 128 that a partial section of the outer wall 126 of the insertion groove 125 is removed to be opened is formed at the second sealing part 122 to prevent the undercut when the sealing member 120 is injection-molded.

Moreover, a support part 135 which protrudes as high as the removed portion 128 is removed is formed on the outer face of the air-conditioning case 110 opposed to the removed portion 128 of the second sealing part 122 to support the second sealing part 122.

That is, one side of the second sealing part 122 gets in contact with the air-conditioning case 110, but the other side is pressed to the dash panel 105 of the vehicle at predetermined pressure, and in this instance, the support part 135 formed on the air-conditioning case 110 is inserted into the removed portion 128 of the second sealing part 122 to support the second sealing part 122 so as to prevent deterioration in sealability.

Meanwhile, the support part 135 is formed to be divided into several parts on the outer face of the air-conditioning case 110 between the circumference supporting wall 131 and the auxiliary supporting wall 132. That is, the support part 135 is divided into several parts and has the removed portion because it has only to support the second sealing part 122.

Furthermore, a stepped portion 127 is formed on the outer face of the second sealing part 122 so that an end portion of the circumference supporting wall 131 is caught to the stepped portion 127.

Additionally, the sealing member 120 is divided into the upper and lower parts, and the upper sealing member 120a is joined to the pipe penetration part 130 of the upper case 110, and the lower sealing member 120b is joined to the pipe penetration part 130 of the lower case 110c.

In other words, because the half of the pipe penetration part 130 which is divided into two parts is formed on the upper case 110a, and the rest of the pipe penetration part 130 is formed on the lower case 110c, the sealing member 120 is also divided into two parts in correspondence with the pipe penetration part 130 to enhance assemblability.

In addition, the flange 101b has a tool insertion hole 101c so that a leakage checking tool 140 can be inserted into the tool insertion hole 101c.

That is, the tool insertion hole 101c is a part to which the leakage checking tool 140 is inserted to check whether or not the air-conditioning case 110 is airtightly sealed after being the components are assembled into the air-conditioning case 110.

In this instance, the tool insertion hole 101c is concavely formed in one side of the flange 101b facing the air-conditioning case 110 between the inlet pipe 101a and the outlet pipe 101a in order to secure sufficient durability when the leakage checking tool 140 is inserted.

Meanwhile, the tool insertion hole 101c is formed in the direction to traverse the flange 101b.

The leakage checking tool 140 has an insertion part which is inserted into the tool insertion hole 101c.

Figure 12:
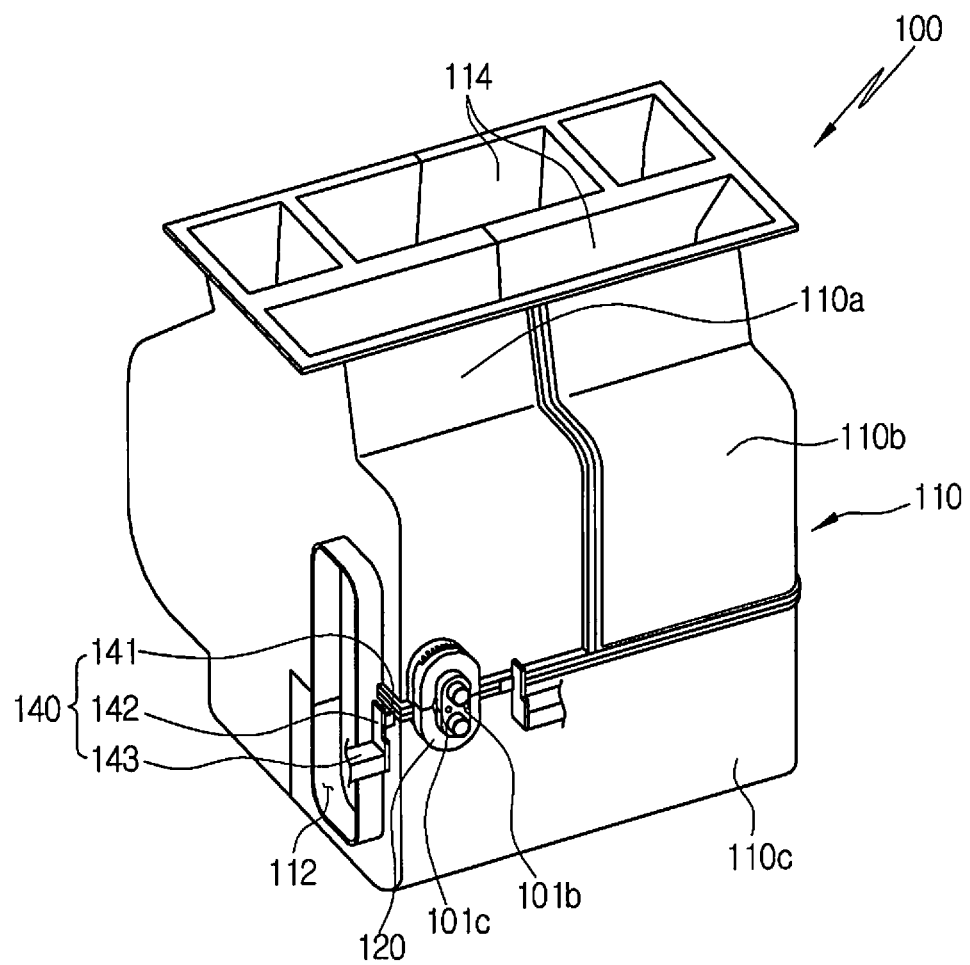
FIG. 12 is a perspective view showing a state where leakage checking tools are arranged at both sides of a tool insertion hole of the flange of the air conditioner for the vehicle according to the present invention.
Figure 13:
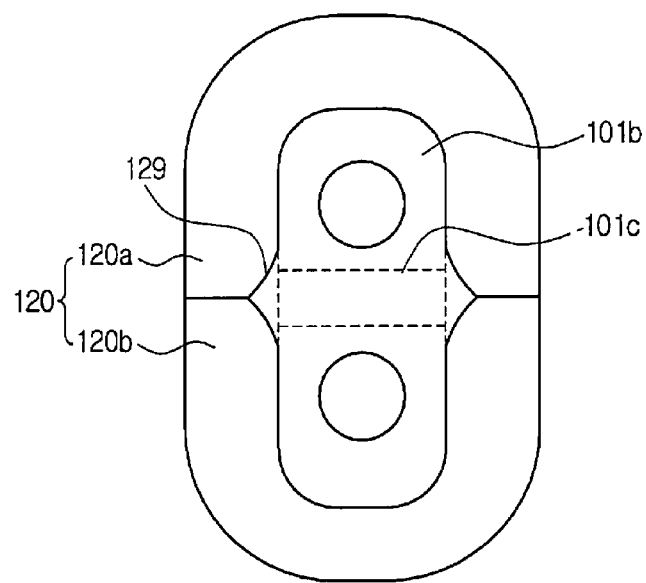
FIG. 13 is a view showing the flange and the sealing member of FIG. 12.
Figure 14:
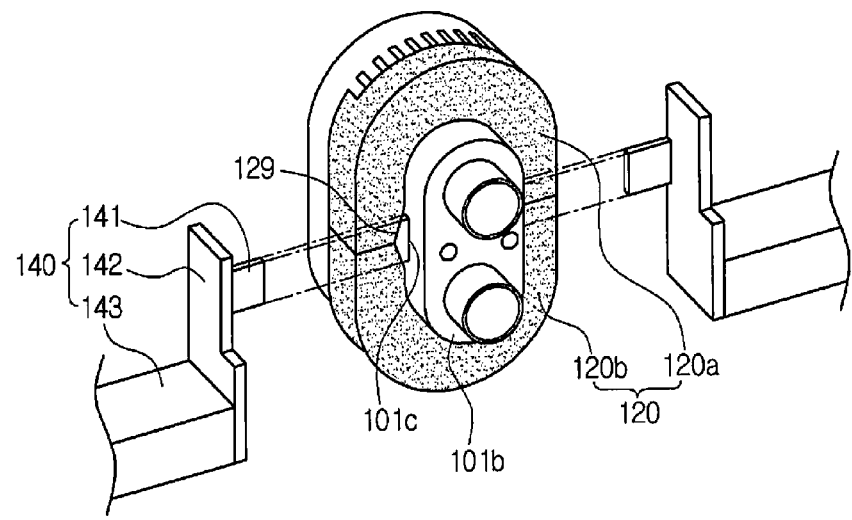
FIG. 14 is a perspective view showing a state where the leakage checking tools are removed from the tool insertion hole of the flange of FIG. 12.
Figure 15:
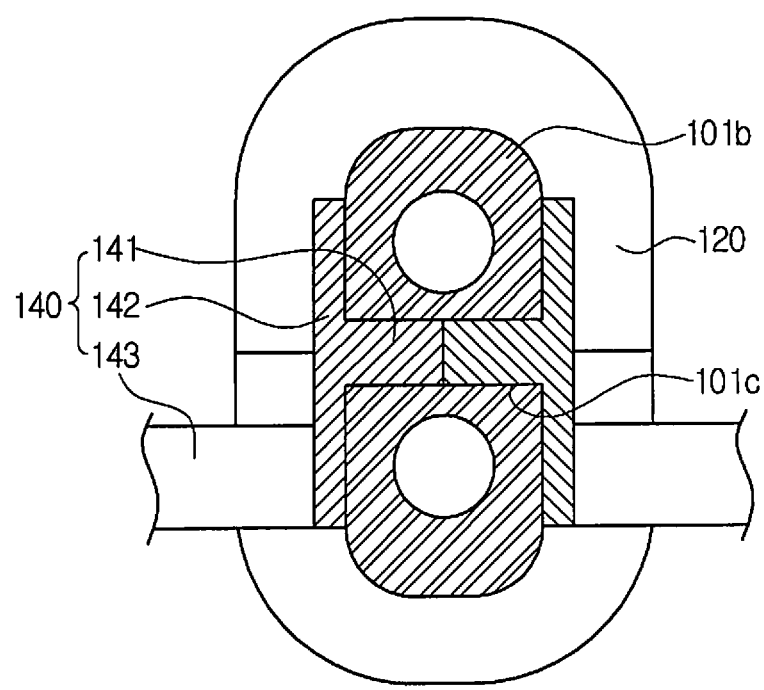
FIG. 15 is a sectional view showing a state where the leakage checking tools are joined to the tool insertion hole of the flange of FIG. 14.

In this instance, referring to FIGS. 12 to 15, there are two the leakage checking tools 140 each of which has the insertion part 141, and the insertion parts 141 are respectively inserted into both end portions of the tool insertion hole 101c at the right and left sides of the flange 101b.

Moreover, the leakage checking tool 140 further includes a blocking part 142 and a moving part 143.

The blocking part 142 may be formed in a plate type which touches the side of the flange 101b to restrict an insertion depth of the insertion part 141.

The moving part 143 serves to move the insertion part 141 and the blocking part 142 so that the insertion part 141 is inserted into the tool insertion hole 101c.

In the meantime, the insertion part 141 is formed at one side of the blocking part 142 and the moving part 143 is formed at the other side.

Of course, the leakage checking tool 140 illustrated in the drawings is illustrated as an example, and the configuration and insertion structure of the leakage checking tool 140 are not restricted to the above.

Furthermore, on the inner face of the sealing member 120 surrounding the outer face of the flange 101b, concave portions 129 are formed at a position corresponding to the tool insertion hole 101c.

The concave portions 129 are formed on the inner face of the sealing member 120 corresponding to both length-direction end portions of the tool insertion hole 101c.

In other words, the concave portions 129 are formed on the sealing member 120 facing inlets of the tool insertion hole 101c of both sides of the flange 101b to easily check the position of the tool insertion hole 101c so that the leakage checking tool 140 can be easily inserted into the tool insertion hole 101c.

In the meantime, the concave portions 129 and the tool insertion hole 101c have their center which are formed on the same virtual straight line so that a user can check the inserted position or state of the leakage checking tool 140 inserted into the tool inserted hole 101c more easily through the insertion part 141.

Hereinafter, an assembling process of the air conditioner for the vehicle according to the present invention will be described. First, a half of the sealing member 120 divided into two parts is fit and joined to the pipe penetration part 130 of the upper case 110a and the rest of the sealing member 120 is fit and joined to the pipe penetration part 130 of the lower case 110c.

Here, the first sealing part 121 of the sealing member 120 is inserted into the pipe penetration part 130 and the insertion groove 125 of the second sealing part 122 is fit and joined to the auxiliary supporting wall 132, and in this instance, the outer circumferential surface of the second sealing part 122 is inserted into the circumference supporting wall 131.

After that, when the evaporator 101 is arranged between the upper and lower cases 110a and 110b and 110c and the upper and lower cases 110a and 110b and 110c are assembled, the sealing member 120 divided into two parts are assembled while contacting with the outer circumferential surface of the flange 101b.

When the upper and lower cases 110a and 110b and 110c are assembled together, the first sealing part 121 of the sealing member 120 seals the space between the pipe penetration part 130 and the outer circumferential surface of the flange 101b, and the insertion groove 125 and the auxiliary supporting wall 132 seals the space between the second sealing part 122 and the air-conditioning case 110. Of course, because the bent portion 132a of the auxiliary supporting wall 132 is fit to the receiving groove of the insertion groove 125 to enhance sealability, it is prevented that the condensate water generated from the flange 101b and the inlet and outlet pipes 101a leaks out.

Meanwhile, during the assembling process of the upper and lower cases 110a, 110b and 110c, other components, such as the heater core 102, the temperature-adjusting door 116 and the mode doors 113a, 114a and 115a, are also assembled.

As described above, when the assembling process of the air conditioner 100 is finished, the air-conditioning case 110 is mounted and assembled to the rear side of the dash panel 105 of the vehicle. In this instance, the flange 101b is assembled to be inserted into the through hole 106 of the dash panel 105. During the above process, the second sealing part 122 of the sealing member 120 is compressed between the dash panel 105 and the air-conditioning case 110 to prevent leakage of the condensate water between the dash panel 105 and the air-conditioning case 110.

Additionally, the sealing member 120 is compressed among the dash panel 105, the air-conditioning case 110 and the flange 101b to seal them, thereby minimizing vibration and noise transferred from the engine room to the air-conditioning case 110.

After that, when the air conditioner 100 is operated and cold refrigerant flows into the evaporator 101 through the inlet and outlet pipes 101a, condensate water is generated on the surface of the evaporator 101 and the inlet and outlet pipes 101a due to heat exchange between the evaporator 101 and the air flowing inside the air-conditioning case 110, and in this instance, the condensate water generated in the inlet and outlet pipes 101a flows toward the pipe penetration part 130 along the inlet and outlet pipes 101a.

Continuously, the condensate water flowing toward the pipe penetration part 130 along the inlet and outlet pipes 101a flows no more by the sealing member 120 and drops down in the direction of gravity to be introduced into the air-conditioning case 110.

The condensate water introduced into the air-conditioning case 110 is discharged out through the condensate outlet 110d formed at the lower portion of the air-conditioning case 110.

As described above, in the present invention, the case that the sealing member 120 is applied to the semi-center type air conditioner, but the present invention is not restricted to the above. The sealing member can be applied to center-mounting type air conditioners, three-piece type air conditioners and independent type air conditioners to obtain the same effect.

What is claimed is:

1. An air conditioner for a vehicle, the air conditioner comprising:
an air-conditioning case;
an evaporator having inlet and outlet pipes, wherein the evaporator is embedded into the air-conditioning case;
a flange joined to end portions of the inlet and outlet pipes;
a pipe penetration part formed in one side of the air conditioning case, wherein the inlet and outlet pipes pass through the pipe penetration part; and
a sealing member which is mounted to surround an outer face of the flange to seal a space between the flange and the pipe penetration part,
wherein the sealing member includes:
a first sealing part which is inserted into the pipe penetration part to seal a space between the outer face of the flange and an inner face of the pipe penetration part; and
a second sealing part which is formed stepped from the first sealing part to seal a space between a dash panel of the vehicle and the outer face of the air-conditioning case;
wherein the flange has a tool insertion hole so that a leakage checking tool can be inserted into the tool insertion hole; and
wherein on the inner face of the sealing member surrounding the outer face of the flange, concave portions are formed at a position corresponding to the tool insertion hole.

2. The air conditioner according to claim 1, further comprising a circumference supporting wall protrudingly formed on the outer face of the air-conditioning case around the pipe penetration part to prevent separation of the sealing member, wherein the circumference supporting wall is spaced apart from the circumference of the pipe penetration part at a predetermined interval and surrounds an outer circumferential surface of the second sealing part.

3. The air conditioner according to claim 2, further comprising:
an auxiliary supporting wall that protrudes from the outer face of the air-conditioning case inside the circumference supporting wall; and
an insertion groove formed in the second sealing part, wherein the auxiliary supporting wall is inserted into the insertion groove.

4. The air conditioner according to claim 3, wherein a bent portion which is bent in one direction is formed at an end portion of the auxiliary supporting wall, and a receiving groove in which the bent portion is accommodated to get in contact is formed in the insertion groove so as to enhance sealing performance between the second sealing part and the air-conditioning case.

5. The air conditioner according to claim 3, wherein a removed portion is formed in the second seal part, wherein the removed portion corresponds to a partial section of an outer wall of the insertion groove that is removed.

6. The air conditioner according to claim 5, wherein a support part is formed on the outer face of the air-conditioning case opposed to the removed portion of the second sealing part to support the second sealing part by insertion into the removed portion.

7. The air conditioner according to claim 6, wherein the support part is formed to be divided into several parts on the outer face of the air-conditioning case between the circumference supporting wall and the auxiliary supporting wall.

8. The air conditioner according to claim 1, wherein the air-conditioning case is divided into upper cases and a lower case, wherein upper and lower are relative to the pipe penetration part, and
   wherein the sealing member is divided into an upper sealing member and a lower sealing member, the upper sealing member is joined to the pipe penetration part of the upper case, and the lower sealing member is joined to the pipe penetration part of the lower case.

9. The air conditioner according to claim 1, wherein a through hole of the sealing member through which the flange passes is formed to be stepped from the outer face of the flange.

10. The air conditioner according to claim 2, wherein a stepped portion is formed on the outer face of the second sealing part so that an end portion of the circumference supporting wall is caught to the stepped portion.

11. The air conditioner according to claim 1, wherein the tool insertion hole is concavely formed in one side of the flange facing the air-conditioning case between the inlet pipe and the outlet pipe.

12. The air conditioner according to claim 1, wherein the concave portions are formed on the inner face of the sealing member corresponding to both length-direction end portions of the tool insertion hole.

\* \* \* \* \*